(12) United States Patent
Wendzel et al.

(10) Patent No.: US 12,195,014 B2
(45) Date of Patent: Jan. 14, 2025

(54) MPC-BASED AUTONOMOUS DRIVE FUNCTION OF A MOTOR VEHICLE

(71) Applicant: ZF Friedrichshafen AG, Friedrichshafen (DE)

(72) Inventors: Andreas Wendzel, Grünkraut (DE); Tobias Mindel, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/786,242

(22) PCT Filed: Dec. 17, 2019

(86) PCT No.: PCT/EP2019/085537
§ 371 (c)(1),
(2) Date: Jun. 16, 2022

(87) PCT Pub. No.: WO2021/121555
PCT Pub. Date: Jun. 24, 2021

(65) Prior Publication Data
US 2023/0026018 A1   Jan. 26, 2023

(51) Int. Cl.
*B60W 50/00* (2006.01)
*B60W 30/14* (2006.01)

(52) U.S. Cl.
CPC ........ *B60W 50/0097* (2013.01); *B60W 30/14* (2013.01); *B60W 2050/0012* (2013.01);
(Continued)

(58) Field of Classification Search
CPC ............. B60W 50/0097; B60W 30/14; B60W 2050/0012; B60W 2050/0022;
(Continued)

(56) References Cited

U.S. PATENT DOCUMENTS 6,483,197 B1 * 11/2002 Masberg ............. F16F 15/1292
74/731.1
10,408,184 B1 * 9/2019 Namuduri ........... F02N 11/0844
(Continued)

FOREIGN PATENT DOCUMENTS

CN   105667343 A * 6/2016
CN   108944866 A * 12/2018 ............ B60T 8/1755
(Continued)

OTHER PUBLICATIONS

CN-108944905-A Translation (Year: 2018).*
(Continued)

*Primary Examiner* — Kyle T Johnson
(74) *Attorney, Agent, or Firm* — Dority & Manning, P.A.

(57) ABSTRACT

A processor unit is configured for determining target torque values (21), which lie within a prediction horizon (20), and target speed values (19), which lie within the prediction horizon (20), by executing an MPC algorithm, which includes a longitudinal dynamics model of a drive train of the motor vehicle. An autonomous driving function of the motor vehicle is carried out in a torque specification operating mode or in a speed specification operating mode as a function of the level of the target torque values (21). In the torque specification operating mode, a prime mover of the drive train is controlled by an open-loop system based on the target torque values (21). In the speed specification operating mode, a speed governor of the drive train is controlled by an open-loop system based on the target speed values (19).

9 Claims, 3 Drawing Sheets

(52) U.S. Cl.
CPC .............. *B60W 2050/0022* (2013.01); *B60W 2050/0037* (2013.01); *B60W 2710/083* (2013.01); *B60W 2720/10* (2013.01)

(58) Field of Classification Search
CPC ... B60W 2050/0037; B60W 2710/083; B60W 2720/10; B60W 30/143; B60W 30/181; B60W 10/08; B60W 20/11; B60W 60/00; B60W 2050/0013; B60W 2050/0025; B60W 2050/0031; B60W 2556/50; B60W 2720/103; B60W 50/00
See application file for complete search history.

(56) References Cited

U.S. PATENT DOCUMENTS

| | | | | |
|---|---|---|---|---|
| 2001/0022166 | A1* | 9/2001 | Yamaguchi | B60W 10/06 123/179.3 |
| 2005/0080535 | A1* | 4/2005 | Steinmetz | B60W 20/00 701/70 |
| 2009/0115354 | A1* | 5/2009 | Heap | B60W 20/00 318/8 |
| 2009/0118079 | A1* | 5/2009 | Heap | B60K 6/26 477/3 |
| 2009/0118081 | A1* | 5/2009 | Heap | B60K 6/445 180/65.265 |
| 2009/0118901 | A1* | 5/2009 | Cawthorne | B60W 20/15 701/33.4 |
| 2010/0198475 | A1* | 8/2010 | Stolzl | B60W 30/18127 303/3 |
| 2011/0276207 | A1* | 11/2011 | Falkenstein | B60W 10/02 903/902 |
| 2015/0239467 | A1* | 8/2015 | Wang | B60W 10/08 180/65.265 |
| 2016/0325745 | A1* | 11/2016 | Kim | B60W 30/16 |
| 2018/0057001 | A1* | 3/2018 | Hu | B60W 30/18072 |
| 2018/0180168 | A1* | 6/2018 | Peterson | F16H 3/091 |
| 2018/0186374 | A1* | 7/2018 | Ando | G05D 1/0088 |
| 2019/0185004 | A1* | 6/2019 | Kim | B60W 50/0097 |
| 2019/0375421 | A1* | 12/2019 | Asher | G05B 13/048 |
| 2020/0070679 | A1* | 3/2020 | Wang | B60L 58/21 |
| 2021/0010902 | A1* | 1/2021 | Breton | G07C 5/02 |
| 2021/0318691 | A1* | 10/2021 | Amini | G05D 1/0278 |
| 2022/0396258 | A1* | 12/2022 | Verbridge | B60K 17/356 |
| 2023/0001935 | A1* | 1/2023 | Hrvatinic | B60W 50/0098 |
| 2023/0026018 | A1* | 1/2023 | Wendzel | B60W 30/14 |
| 2023/0049927 | A1* | 2/2023 | Engel | B60W 60/005 |
| 2023/0083854 | A1* | 3/2023 | Jaccoud | B60W 10/08 701/22 |

FOREIGN PATENT DOCUMENTS

| | | | | |
|---|---|---|---|---|
| CN | 108944905 | A * | 12/2018 | ............ B60W 10/06 |
| CN | 110254425 | A * | 9/2019 | |
| DE | 10221835 | A1 | 12/2003 | |

OTHER PUBLICATIONS

CN-105667343-A Translation (Year: 2016).*
CN-108944866-A Translation (Year: 2018).*
CN-110254425-A translation (Year: 2019).*
International Search Report (English Translation) PCT/EP2019/085537, dated Sep. 15, 2020. (3 pages).

* cited by examiner

MPC-BASED AUTONOMOUS DRIVE FUNCTION OF A MOTOR VEHICLE

CROSS-REFERENCE TO RELATED APPLICATION

The present application is a U.S. national phase of PCT/EP2019/085537 filed in the European Patent Office on Dec. 17, 2019, which is incorporated by reference in its entirety for all purposes.

FIELD OF THE INVENTION

The invention relates generally to the execution of an autonomous driving function of a motor vehicle by model predictive control.

BACKGROUND

Methods of model predictive control (MPC) are utilized in the field of closed-loop trajectory control, for example, for closed-loop prime mover control in the context of autonomous driving. Autonomous driving strategies utilize surroundings data, map data, and vehicle data in order to determine an optimal vehicle behavior.

DE 10 2014 209687 A1 teaches a method for the anticipatory operation of a motor vehicle based on a specification of multiple driving-relevant manipulated variables. A first electronic horizon is provided for a first portion of a route to be traveled and a second electronic horizon is provided for a second portion of a route to be traveled, wherein the first electronic horizon and the second electronic horizon each have one or multiple route section(s), wherein associated with each of the route sections is/are one or multiple route parameter(s) and/or one or multiple manipulated variable restriction(s). In addition, a cost function is provided for multiple target variables to be optimized as a function of profiles of the driving-relevant manipulated variables (SG) over the route to be traveled. Moreover, a first optimization step is carried out, wherein the cost function is optimized with an established specification of the profile of at least one of the manipulated variables (SG) in order to obtain a dependence between the multiple target variables as the result of the first optimization step. In addition, the cost function is applied with the obtained dependence between the target variables as a boundary condition at the end of the first electronic horizon and a second optimization step is carried out with the applied cost function for the first electronic horizon.

In addition, DE 102 21 835 A1 describes a method for the closed-loop control of a starting component (for example, a hydrodynamic torque converter, a clutch, or an electric machine in the case of hybrid drives) of a motor vehicle in the crawling mode, wherein a target crawl torque value is set at the starting component, which is set as a function of at least one of the following surroundings conditions or driver specifications of the motor vehicle, namely as a function of the current inclination of the motor vehicle, as a function of the brake pedal pressure effectuated by a driver of the motor vehicle, as a function of the distance of the motor vehicle to obstacles, or as a function of the driver type.

SUMMARY OF THE INVENTION

Example aspects of the present invention provide improved execution of an autonomous driving function of a motor vehicle by model predictive control when the motor vehicle is to decelerate or be brought to a standstill.

According to example aspects of the invention, an MPC algorithm or an MPC solver for an autonomous driving function of a motor vehicle having a prime mover, in particular having an electric motor, provides optimized target torque values for the electric motor as well as optimized target speed values for the motor vehicle. In the case of positive target torque values, the torque can be utilized as a manipulated variable for the electric motor, optionally with a superimposed speed control. This has advantages with respect to comfort and with respect to the subsequent behavior of the motor vehicle. When the motor vehicle is to stop, however, and the target torque assumes negative values for this purpose, it is provided to change over to speed control. The change-over from torque control to speed control can be carried out, in particular, at the zero crossing of the target torque, which is particularly advantageous, in particular, for reasons related to the comfort of vehicle occupants, since the change-over can take place in a jerk-free and unnoticeable manner. Example aspects of the present invention make it possible to follow an optimal speed trajectory, wherein a stop function ahead of obstacles or a traffic light is possible despite speed control.

In this sense, according to a first example aspect of the invention, a processor unit is provided for executing an autonomous driving function of a motor vehicle by model predictive control. The processor unit can access an MPC algorithm. The MPC algorithm includes a longitudinal dynamics model of a drive train of the motor vehicle. In addition, the MPC algorithm includes, in particular, a cost function.

The longitudinal dynamics model of the drive train can include a vehicle model with vehicle parameters and drive train losses (in part, approximated characteristic maps). In particular, findings regarding upcoming route topographies (for example, curves and uphill grades) can be incorporated into the longitudinal dynamics model of the drive train. In addition, findings regarding speed limits on the upcoming route can also be incorporated into the longitudinal dynamics model of the drive train.

Current state variables can be measured and appropriate data can be recorded and supplied to the MPC algorithm. In this way, route data from an electronic map can be updated, in particular cyclically, for an anticipation horizon or prediction horizon (for example, four hundred meters (400 m)) ahead of the motor vehicle. The route data can include, for example, uphill grade information, curve information, and information about speed limits. Moreover, a curve curvature can be converted, via a maximum permissible lateral acceleration, into a speed limit for the motor vehicle. In addition, a position finding of the motor vehicle can be carried out, in particular via a GNSS signal for the precise localization on the electronic map or via a SLAM (Simultaneous Localization and Mapping) algorithm.

The processor unit is configured for determining target torque values that lie within a prediction horizon by executing the MPC algorithm. The target torque values establish the torque that a prime mover of the drive train is to provide in order to drive the motor vehicle, in particular at a discrete waypoint within the prediction horizon. In particular, the processor unit is configured for determining the target torque values by executing the MPC algorithm such that the cost function is minimized. The determination of the target torque values can be carried out, in particular, such that one target torque value is associated with one discrete waypoint within the prediction horizon in each case. The target torque value is the value that the torque is to assume at the waypoint concerned in order to drive the motor vehicle as desired.

The processor unit is configured for determining target speed values that lie within a prediction horizon by executing the MPC algorithm. The target speed values establish the speed at which the motor vehicle is to move, in particular at a discrete waypoint within the prediction horizon. In particular, the processor unit is configured for determining the target speed values by executing the MPC algorithm such that the cost function is minimized. The determination of the target speed values can be carried out, in particular, such that one target speed value is associated with one discrete waypoint within the prediction horizon in each case. The target speed value is the value at which the motor vehicle is to move at the waypoint concerned.

The processor unit is also configured for carrying out an autonomous driving function of the motor vehicle as a function of the level of the target torque values in a torque specification operating mode or in a speed specification operating mode by executing the MPC algorithm.

The autonomous driving function enables the motor vehicle to travel autonomously, i.e., without a vehicle occupant controlling the motor vehicle. The driver has handed over the control of the motor vehicle to a driver assistance system. Thus, the autonomous driving function includes the motor vehicle being configured—in particular by he central processor unit—for carrying out, for example, steering, turn-signaling, acceleration, and braking maneuvers without human intervention and controlling, by an open-loop system, in particular, external lighting and signaling, such as turn-signal lights of the motor vehicle. The autonomous driving functions can also include a semi-autonomous driving function, which assists a driver of the motor vehicle in the control of the motor vehicle, in particular during steering, turn-signaling, acceleration, and braking maneuvers, wherein the driver still has the control of the motor vehicle.

Depending on how high the target torque values are, the autonomous driving function is carried out in the torque specification operating mode or in the speed specification operating mode. In particular when the torques are positive or greater than zero, the autonomous driving function is carried out in the torque specification operating mode. In particular when the target torque values are negative or zero, the autonomous driving function is carried out in the speed specification operating mode.

In the torque specification operating mode, the prime mover of the drive train is controlled by an open-loop system based on the target torque values. This open-loop control can be carried out by the processor unit. The processor unit can be configured for carrying out the open-loop control. In addition, a driver assistance system can also take over the open-loop control of the prime mover. The prime mover can be an electric machine, in particular an electric motor. In addition, the prime mover can also be an internal combustion engine. Moreover, the prime mover can also be a hybrid drive unit, which includes an electric machine and an internal combustion engine for driving the motor vehicle.

In the speed specification operating mode, a speed governor of the drive train is controlled by an open-loop system based on the target speed values. This open-loop control can be carried out by the processor unit. The processor unit can be configured for carrying out the open-loop control. In addition, a driver assistance system can also take over the open-loop control of the speed governor. In the speed specification operating mode, the speed governor can be activated in an actuator of the motor vehicle or of the prime mover, in particular of the electric motor, and then regulates the predefined target speed values. As a result, the risk of driving in reverse ahead of the obstacle or ahead of the traffic light can be avoided.

In the case of a positive target torque, an application of the torque specification can be carried out. Thus, in one example embodiment, the processor unit can be configured for carrying out the autonomous driving function in the torque specification operating mode when a target torque value assumes a positive value by executing the MPC algorithm. A good subsequent behavior of the motor vehicle results due to the torque-controlled operation of the prime mover of the drive train.

In the case of positive target torque values, a speed control can be superimposed on the torque-controlled operation of the prime mover (speed-controlled with precontrol of the torque). This represents a combination of the torque specification operating mode with the speed specification operating mode. In this sense, the processor in one further example embodiment is configured for controlling, by way of an open-loop system, the speed governor of the drive train based on the target speed values when a target torque value assumes a positive value by executing the MPC algorithm.

With respect to stopping ahead of obstacles (for example, a traffic light or a preceding vehicle), a torque control is less suitable, however, for reproducibly regulating the distance. There is a risk of accelerating backwards and/or of the vehicle traveling in reverse, for example, ahead of a traffic light. As a solution to this problem, it is provided, in the case of a negative target torque, that a pure application of the speed control is carried out. As a result, it can be reliably ensured that the motor vehicle does not inadvertently travel in reverse ahead of an obstacle or ahead of a traffic light. In this sense, the processor unit can be configured for carrying out the autonomous driving function exclusively in the speed specification operating mode when a target torque value assumes a negative value by executing the MPC algorithm. The possibility of utilizing further brake units (for example, the service brake of the vehicle) is unaffected by this.

The point in time at which a change-over takes place from the torque specification operating mode into the speed specification operating mode (and also vice versa) plays an important role. If the change-over takes place only shortly before the motor vehicle comes to a standstill, when the target torque values have already assumed negative values for a long time, disadvantages with respect to comfort can result or complicated transition functions must be taken into account. It is desirable for the motor vehicle to come to a standstill at the right time at the right spot ahead of an obstacle or ahead of a traffic light. Example aspects of the present invention recognize that a change-over from the torque specification operating mode into the speed specification operating mode (and vice versa) precisely at the zero crossing of the target torque value is particularly advantageous. The change-over at this point in time is not or hardly noticeable to occupants of the motor vehicle. In addition, it is made possible as a result that the motor vehicle can stop precisely at the desired point in time and precisely at the correct spot by the autonomous driving function.

In this sense, the processor unit in one example embodiment is configured for changing over from the torque specification operating mode into the speed specification operating mode at a first point in time by executing the MPC algorithm, wherein a first target torque value assumes the value zero at the first point in time and wherein a second target torque value assumes a negative value at an immediately following second point in time. The feature "immediately following point in time" can be understood to mean that target torque values are generated at discrete points in time, wherein the first point in time and the second point in time are two directly consecutive, discrete points in time. This example embodiment makes it possible for the change-over from the torque specification operating mode into the speed specification operating mode to be carried out at the zero crossing of the torque in a jerk-free and unnoticeable manner. Both conditions must be met, in particular, cumulatively, i.e., a negative target torque value must follow the value "target torque value equal to zero", so that the change-over into the speed specification operating mode takes place. In other words, the target torque values are to drop into the negative range at the zero crossing.

In addition, a change-over from the speed specification operating mode into the torque specification operating mode can also take place at a zero crossing of the target torque value. This zero crossing can be detected or defined, in particular, due to the fact that a target torque value assumes the value zero and an immediately following target torque value is positive. In other words, the target torque values rise into the positive range at the zero crossing. In this sense, the processor unit can be configured for changing over from the speed specification operating mode (back) into the torque specification operating mode at a third point in time by executing the MPC algorithm, wherein a third target torque value assumes the value zero at the third point in time and wherein a fourth target torque value assumes a positive value at an immediately following fourth point in time.

In one further example embodiment, the prime mover is an electric machine and the MPC algorithm includes a cost function to be minimized. The cost function can include, as a first term, an electrical energy weighted with a first weighting factor and predicted according to the longitudinal dynamics model, which is provided within the prediction horizon by a battery of the drive train for driving the electric machine. The cost function can include, as a second term, a driving time weighted with a second weighting factor and predicted according to the longitudinal dynamics model, which the motor vehicle needs in order to cover the entire distance predicted within the prediction horizon. The processor unit can be configured for determining an input variable for the electric machine by executing the MPC algorithm as a function of the first term and as a function of the second term such that the cost function is minimized. This example embodiment makes it possible for the objective function or the cost function of a "driving efficiency" driving strategy to include one further term in addition to the energy consumption, as the result of which, additionally, the driving time is also minimized. As a result, depending on the selection of the weighting factors, a low speed is not always evaluated as optimal and, thus, the problem that the resultant speed is always at the lower edge of the permitted speed does not exist.

The cost function can have exclusively linear and quadratic terms. As a result, the overall problem has the form of a quadratic optimization with linear constraints and a convex problem results, which can be solved well and quickly. The objective function or the cost function can be formulated with a weighting (weighting factors), wherein, in particular, an energy efficiency, a driving time, and a ride comfort are calculated and weighted. An energy-optimal speed trajectory can be calculated online for an upcoming horizon on the processor unit, which can form, in particular, an integral part of a central control unit of the motor vehicle. By utilizing the MPC method, in addition, the target speed of the motor vehicle can be cyclically recalculated based on the current driving mode and the upcoming route information.

A minimization of the driving time for the prediction horizon and a minimization of consumed energy are carried out by the cost function of the MPC algorithm. In one example embodiment, a minimization of torque changes for the prediction horizon is also carried out. With respect to the input for the model predictive control, for example, speed limits, physical limits for the torque, and rotational speeds of the electric machine can be supplied to the MPC algorithm as constraints. In addition, control variables for the optimization can be supplied to the MPC algorithm as input, in particular the speed of the vehicle (which can be proportional to the rotational speed), the torque of the electric machine, and the state of charge of the battery. As the output of the optimization, the MPC algorithm can yield an optimal rotational speed and an optimal torque for calculated points in the anticipation horizon. With respect to the implementation of the MPC in the vehicle, a software module can be connected downstream from the MPC algorithm, which determines a currently relevant state and transmits this to a power electronics unit.

Energy consumption and driving time can both be evaluated and weighted at the end of the horizon. This term is therefore active only for the last point of the horizon. In this sense, the cost function in one example embodiment includes an energy consumption final value—weighted with the first weighting factor—which the predicted electrical energy assumes at the end of the prediction horizon, and the cost function includes a driving time final value—weighted with the second weighting factor—which the predicted driving time assumes at the end of the prediction horizon.

In order to ensure comfortable driving, additional terms can be introduced for penalizing torque surges. In this sense, the cost function can include a third term having a third weighting factor, wherein the third term includes a value of a torque that the electric machine provides for driving the motor vehicle, which is predicted according to the longitudinal dynamics model, and wherein the processor unit is configured for determining the input variable for the electric machine by executing the MPC algorithm as a function of the first term, as a function of the second term, and as a function of the third term such that the cost function is minimized.

For the first point in the horizon, the deviation from the most recently set torque can be evaluated as negative in order to ensure that there is a seamless and smooth transition during the change-over between an old trajectory and a new trajectory. In this sense, the third term can include a first value—weighted with the third weighting factor—of a torque that the electric machine provides for driving the motor vehicle to a first waypoint within the prediction horizon, which is predicted according to the longitudinal dynamics model. The third term can include a zeroth value—weighted with the third weighting factor—of a torque that the electric machine provides for driving the motor vehicle to a zeroth waypoint, which is situated directly ahead of the first waypoint. The zeroth torque can be, in particular, a real—not merely predicted—torque provided by the electric machine. In the cost function, the zeroth value of the torque can be subtracted from the first value of the torque.

Alternatively, the third term can include a first value—weighted with the third weighting factor—of a drive force that the electric machine provides for driving the motor vehicle to a first waypoint within the prediction horizon, which is predicted according to the longitudinal dynamics model. The third term includes a zeroth value—weighted with the third weighting factor—of a drive force that the electric machine provides for driving the motor vehicle to a zeroth waypoint, which is situated directly ahead of the first waypoint, wherein, in the cost function, the zeroth value of the drive force is subtracted from the first value of the drive force.

The waypoints that are taken into account by the MPC algorithm are, in particular, discrete waypoints that follow one another at a certain frequency. In this sense, the zeroth waypoint and the first waypoint represent discrete waypoints, wherein the first waypoint immediately follows the zeroth waypoint. The zeroth waypoint can be situated before the prediction horizon. The zeroth torque value can be measured or determined for the zeroth waypoint. The first waypoint represents, in particular, the first waypoint within the prediction horizon. The first torque value can be predicted for the first waypoint. Therefore, the actually determined zeroth torque value can be compared with the predicted first torque value.

Additionally, excessively high torque gradients within the horizon are disadvantageous, and so, in one example embodiment, these are already penalized in the objective function. For this purpose, the quadratic deviation of the drive force per meter can be weighted and minimized in the objective function. In this sense, the cost function can include a fourth term having a fourth weighting factor, wherein the fourth term includes a gradient of the torque predicted according to the longitudinal dynamics model or an indicator value for a gradient of the torque predicted according to the longitudinal dynamics model. The processor unit is configured for determining the input variable for the electric machine by executing the MPC algorithm as a function of the first term, as a function of the second term, as a function of the third term, and as a function of the fourth term such that the cost function is minimized.

In one example embodiment, the fourth term includes a quadratic deviation of the gradient of the torque, which has been multiplied by the fourth weighting factor and summed. In addition, the cost function can include a quadratic deviation—which has been summed with the fourth weighting factor—of a drive force that the electric machine provides in order to propel the motor vehicle one meter in the longitudinal direction. In this sense, the fourth term can include a quadratic deviation—which has been multiplied by the fourth weighting factor and summed—of a drive force that the electric machine provides in order to propel the motor vehicle one meter (1 m) in the longitudinal direction.

Speed limits, which can be established, for example, by road traffic regulations, are hard limits for the optimization, which are not to be exceeded. A slight exceedance of the speed limits is always permissible in reality and tends to be the normal case primarily during transitions from one speed zone into a second zone. In dynamic surroundings, in which speed limits shift from one computing cycle to the next computing cycle, it can happen, in the case of very hard limits, that a valid solution for a speed profile can no longer be found. In order to increase the stability of the computational algorithm, a soft constraint can be introduced into the objective function. In particular, a slack variable can become active in a predefined narrow range before the hard speed limit is reached. Solutions that are situated very close to this speed limit can be evaluated as poorer, i.e., solutions, the speed trajectory of which maintains a certain distance to the hard limit. In this sense, the cost function can include, as a fifth term, a slack variable weighted with a fifth weighting factor, wherein the processor unit is configured for determining the input variable for the electric machine by executing the MPC algorithm as a function of the first term, as a function of the second term, as a function of the third term, as a function of the fourth term, and as a function of the fifth term such that the cost function is minimized.

According to a second example aspect of the invention, a motor vehicle is provided. The motor vehicle includes a processor unit according to the first example aspect of the invention, a prime mover, a speed governor, and a driver assistance system. The driver assistance system is configured for accessing target torque values and target speed values by a communication interface, wherein the target torque values and the target speed values have been determined by the processor unit. In addition, the driver assistance system is configured for carrying out an autonomous driving function of the motor vehicle as a function of the level of the target torque values in a torque specification operating mode or in a speed specification operating mode, wherein, in the torque specification operating mode, the prime mover is controlled by an open-loop system based on the target torque values and, wherein, in the speed specification operating mode, the speed governor is controlled by an open-loop system based on the target speed values. The vehicle is, for example, a motor vehicle, such as an automobile (for example, a passenger car having a weight of less than three and a half tons (3.5 t)), a motorcycle, a motor scooter, a moped, a bicycle, an e-bike, a bus, or a truck, for example, having a weight of over 3.5 t. The vehicle can belong, for example, to a vehicle fleet.

According to a third example aspect of the invention, a method is provided for carrying out an autonomous driving function of a motor vehicle by model predictive control. The method includes
  determining target torque values, which lie within a prediction horizon, by executing an MPC algorithm, which includes a longitudinal dynamics model of a drive train of the motor vehicle,
  determining target speed values, which lie within the prediction horizon, by executing an MPC algorithm, and
  carrying out an autonomous driving function of the motor vehicle as a function of the level of the target torque values in a torque specification operating mode or in a speed specification operating mode, wherein, in the torque specification operating mode, a prime mover of the drive train is controlled by an open-loop system based on the target torque values and, wherein, in the speed specification operating mode, a speed governor of the drive train is controlled by an open-loop system based on the target speed values.

According to a fourth example aspect of the invention, a computer program product is provided for carrying out an autonomous driving function of a motor vehicle by model predictive control, wherein the computer program product, when run on a processor unit, by executing an MPC algorithm, which includes a longitudinal dynamics model of a drive train of the motor vehicle, instructs the processor unit to
  determine target torque values, which lie within a prediction horizon,
  determine target speed values, which lie within the prediction horizon,
  carry out an autonomous driving function of the motor vehicle in a torque specification operating mode or in a speed specification operating mode as a function of the level of the target torque values, wherein, in the torque specification operating mode, a prime mover of the drive train is controlled by an open-loop system based on the target torque values, and wherein, in the speed specification operating mode, a speed governor of the drive train is controlled by an open-loop system based on the target speed values.

According to a fifth example aspect of the invention, a computer-readable medium is provided, on which the computer program product according to the fourth example aspect of the invention is stored.

The aforementioned definitions and comments presented with respect to technical effects, advantages, and advantageous example embodiments of the processor unit also apply similarly for the vehicle according to the second example aspect of the invention, for the method according to the third example aspect of the invention, for the computer program product according to the fourth example aspect of the invention, and for the computer-readable medium according to the fifth example aspect of the invention.

BRIEF DESCRIPTION OF THE DRAWINGS

Exemplary embodiments of the invention are explained in greater detail in the following with reference to the diagrammatic drawing, wherein identical or similar elements are labeled with the same reference character, wherein.

DETAILED DESCRIPTION

Figure 1:
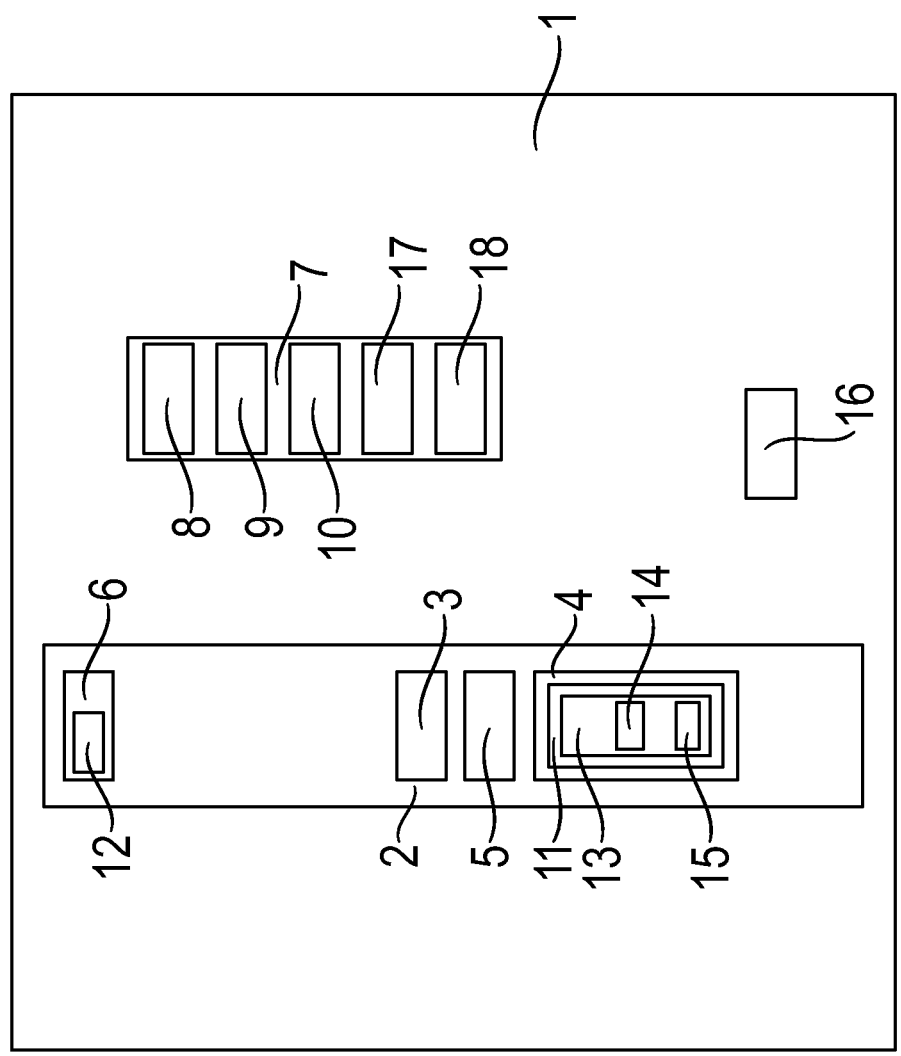
FIG. 1 shows a schematic of a vehicle including a drive train, which includes an electric machine and a battery.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a motor vehicle 1, for example, a passenger car. The motor vehicle 1 includes a system 2 for the model predictive control of an electric machine of a drive train of the motor vehicle 1. The system 2 in the exemplary embodiment shown includes a processor unit 3, a memory unit 4, a communication interface 5, and a detection unit 6 for detecting state data related to the motor vehicle 1. The motor vehicle 1 also includes a drive train 7, which can include, for example, an electric machine 8, which can be operated as a motor and as a generator, a battery 9, a transmission 10, and a speed governor 18. The electric machine 8, in the motor mode, can drive wheels of the motor vehicle 1 via the transmission 10, which can have, for example, a constant ratio. The battery 9 can provide the electrical energy necessary therefor. The battery 9 can be charged by the electric machine 8 when the electric machine 8 is operated in the generator mode (recuperation). Optionally, the battery 9 can also be charged at an external charging station. Likewise, the drive train of the motor vehicle 1 can optionally include an internal combustion engine 17, which, alternatively or in addition to the electric machine 8, can drive the motor vehicle 1. The internal combustion engine 17 can also drive the electric machine 8 in order to charge the battery 9.

A computer program product 11 can be stored on the memory unit 4. The computer program product 11 can be run on the processor unit 3, for the purpose of which the processor unit 3 and the memory unit 4 are connected to each other by the communication interface 5. When the computer program product 11 is run on the processor unit 3, the computer program product 11 instructs the processor unit 3 to perform the functions described in conjunction with the drawing and/or to carry out the method described in conjunction with the drawing.

The computer program product 11 includes an MPC algorithm 13. The MPC algorithm 13 includes a longitudinal dynamics model 14 of the drive train 7 of the motor vehicle 1 and a cost function 15 to be minimized. The processor unit 3 executes the MPC algorithm 13 and thereby predicts a behavior of the motor vehicle 1 based on the longitudinal dynamics model 14, wherein the cost function 15 is minimized. Target torque values of the electric machine 8 and target speed values of the motor vehicle 1 for calculated points in the prediction horizon result as the output of the optimization by the MPC algorithm 13. For this purpose, the processor unit 3 can determine input variables for the electric machine 8 and for the speed governor 18 such that the optimal torque and/or the optimal speed result(s). The processor unit 3 can control, by way of an open-loop system, the electric machine 8 and the speed governor 18 based on the determined input variable. In addition, this can also be carried out by a driver assistance system 16, however.

The detection unit 6 can measure current state variables of the motor vehicle 1, record appropriate data, and supply these to the MPC algorithm 13. In this way, route data from an electronic map can be updated, in particular cyclically, for an anticipation horizon or prediction horizon (for example, four hundred meters (400 m)) ahead of the motor vehicle 1. The route data can include, for example, uphill grade information, curve information, and information about speed limits. Moreover, a curve curvature can be converted, via a maximum permissible lateral acceleration, into a speed limit for the motor vehicle 1. In addition, a position finding of the motor vehicle 1 can be carried out by the detection unit 6, in particular via a signal generated by a GNSS sensor 12 for the precise localization on the electronic map. The processor unit 3 can access this information, for example, via the communication interface 5.

An exemplary longitudinal dynamics model 14 of the motor vehicle 1 can be expressed mathematically as follows:

$$\frac{dv(t)}{dt} = (F_{trac}(t) - F_r(\alpha(t)) - F_{gr}(\alpha(t)) - F_d(v(t)))/m_{eq}$$

Wherein:

v is the speed of the motor vehicle;

$F_{trac}$ is the tractive force that is exerted by the prime mover or the brakes upon the wheels of the motor vehicle;

$F_r$ is the rolling resistance, which is an effect of the deformation of the tires during rolling and depends on the load of the wheels (on the normal force between the wheel and the road) and, thus, on the inclination angle of the road;

$F_{gr}$ is the gradient resistance, which describes the longitudinal component of gravity, which acts upon the motor vehicle during operation uphill or downhill, depending on the gradient of the roadway;

$F_d$ is the drag force of the motor vehicle; and $m_{eq}$ is the equivalent mass of the motor vehicle; the equivalent mass includes, in particular, the inertia of the turned parts of the drive train, which are subjected to the acceleration of the motor vehicle (prime mover, transmission input shafts, wheels).

By converting time dependence into distance dependence $$\frac{d}{ds} = \frac{d}{dt} * \frac{dt}{ds} = \frac{d}{dt} * \frac{1}{v}$$

and coordinate transformation in order to eliminate the quadratic speed term in the aerodynamic drag with $e_{kin} = \frac{1}{2} * m_{eq} * v(t)^2$ f, the result is $$\frac{de_{kin}}{ds} = F_{trac}(s) - F_r(\alpha(s)) - F_{gr}(\alpha(s)) - F_d(e_{kin}(s)).$$

In order to ensure that the problem is quickly and easily solvable by the MPC algorithm 13, the dynamic equation of the longitudinal dynamics model 14 is linearized, in that the speed is expressed, via coordinate transformation, by kinetic energy $de_{kin}$. As a result, the quadratic term for calculating the aerodynamic drag $F_d$ is replaced by a linear term and, simultaneously, the longitudinal dynamics model 14 of the motor vehicle 1 is no longer described as a function of time, as usual, but rather as a function of distance. This fits well with the optimization problem, since the anticipatory information of the electrical horizon is based on distance.

Figure 2:
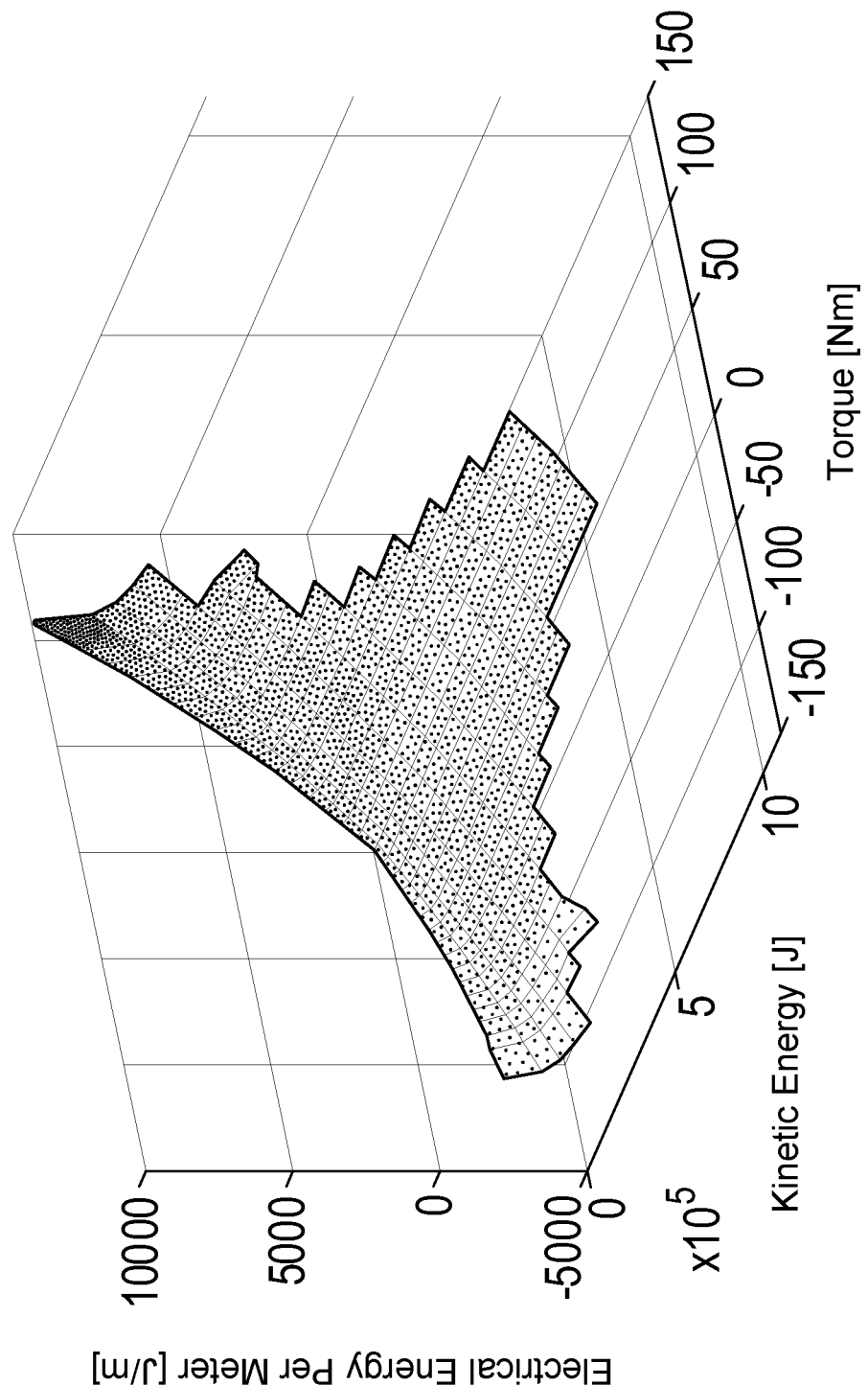
FIG. 2 shows a characteristic map of an electric machine for the vehicle according to FIG. 1.

In addition to the kinetic energy, there are two further state variables, which, in the sense of a simple optimization problem, must also be described in a linear and distance-dependent manner. On the one hand, the electrical energy consumption of the drive train 7 is usually described in the form of a characteristic map as a function of torque and prime mover speed. In the exemplary embodiment shown, the motor vehicle 1 has a fixed ratio between the electric machine 8 and the road on which the motor vehicle 1 moves. As a result, the rotational speed of the electric machine 8 can be directly converted into a speed of the motor vehicle 1 or even into a kinetic energy of the motor vehicle 1. In addition, the electrical power of the electric machine 8 can be converted into energy consumption per meter via division by the appropriate speed. As a result, the characteristic map of the electric machine 8 obtains the form shown in FIG. 2. In order to be able to utilize this characteristic map for the optimization, it is linearly approximated: $\text{Energy}_{perMeter} \geq a_i * e_{kin} + b_i * F_{trac}$ for all i.

An exemplary cost function 15 to be minimized can be expressed mathematically as follows:

$$\min\left(-w_{Bat} \cdot E_{Bat}(s_E) + w_{Time} \cdot T(s_E) + w_{Tem} \cdot \sum_{s=1}^{s_E-1}\left(\frac{F_A(s) - F_A(s-1)}{\Delta s}\right)^2 + w_{TemStart} \cdot (F_A(s_1) - F_A(s_0))^2 + \sum_{s=1}^{s_E-1} w_{Slack} \cdot \text{Var}_{slack}\right)$$

Wherein:

$w_{Bat}$ is the weighting factor for the energy consumption of the battery $E_{Bat}$ is the energy consumption of the battery S is the distance $S_{E-1}$ is the distance one time step before the end of the prediction horizon $F_A$ is the drive force that is provided by the electric machine, transmitted by a transmission at a constant ratio, and applied at a wheel of the motor vehicle $W_{Tem}$ is the weighting factor for torque gradients $W_{TemStart}$ is the weighting factor for torque surges T is the time that the vehicle needs in order to cover the entire distance predicted within the prediction horizon $W_{Time}$ is the weighting factor for the time T $S_E$ is the distance to the end of the horizon $W_{Slack}$ is the weighting factor for the slack variable $\text{Var}_{slack}$ is the slack variable The cost function 15 has exclusively linear and quadratic terms. As a result, the overall problem has the form of a quadratic optimization with linear constraints and a convex problem results, which can be solved well and quickly.

The cost function 15 includes, as a first term, an electrical energy $E_{Bat}$ weighted with a first weighting factor $w_{Bat}$ and predicted according to the longitudinal dynamics model, which is provided within a prediction horizon by the battery 9 of the drive train 7 for driving the electric machine 8.

The cost function 15 includes, as a second term, a driving time T weighted with a second weighting factor $W_{Time}$ and predicted according to the longitudinal dynamics model 14, which the motor vehicle 1 needs in order to cover the predicted distance. As a result, depending on the selection of the weighting factors, a low speed is not always evaluated as optimal and, thus, the problem that the resultant speed is always at the lower edge of the permitted speed no longer exists.

The energy consumption and the driving time can both be evaluated and weighted at the end of the horizon. These terms are therefore active only for the last point of the horizon.

Excessively high torque gradients within the horizon are disadvantageous. Therefore, torque gradients are already penalized in the cost function 15, namely by the term $$w_{Tem} \cdot \sum_{k=1}^{s_E-1}\left(\frac{F_A(s) - F_A(s-1)}{\Delta s}\right)^2.$$

The quadratic deviation of the drive force per meter is weighted with a weighting factor $W_{Tem}$ and minimized in the cost function. Alternatively to the drive force $F_A$ per meter, the torque $M_{EM}$ provided by the electric machine 8 can also be utilized and weighted with the weighting factor $W_{Tem}$, and so the alternative term $$w_{Tem} \cdot \sum_{k=1}^{s_E-1}\left(\frac{M_{EM}(s) - M_{EM}(s-1)}{\Delta s}\right)^2$$

results. Due to the constant ratio of the transmission 10, the drive force and the torque are directly proportional to one another.

In order to ensure comfortable driving, one further term is introduced in the cost function 15 for penalizing torque surges, namely $w_{TemStart} \cdot (F_A(s_1) - F_A(s_0))^2$. Alternatively to the drive force $F_A$, the torque $M_{EM}$ provided by the electric machine 8 can also be utilized here, and so the alternative term $W_{TemStart} \cdot (M_{EM}(s_1) - (M_{EM}(s_0))^2$ results. For the first point in the prediction horizon, the deviation from the most recently set torque can be evaluated as negative and weighted with a weighting factor $W_{temStart}$ in order to ensure that there is a seamless and smooth transition during the change-over between an old trajectory and a new trajectory.

Speed limits are hard limits for the optimization that are not permitted to be exceeded. A slight exceedance of the speed limits is always permissible in reality and tends to be the normal case primarily during transitions from one speed zone into a second zone. In dynamic surroundings, where speed limits shift from one computing cycle to the next computing cycle, it can happen, in the case of very hard limits, that a valid solution for a speed profile can no longer be found. In order to increase the stability of the computational algorithm, a soft constraint is introduced into the cost function 15. A slack variable $Var_{slack}$ weighted with a weighting factor $W_{slack}$ becomes active in a predefined narrow range before the hard speed limit is reached. Solutions that are situated very close to this speed limit are evaluated as poorer, i.e., solutions, the speed trajectory of which maintains a certain distance to the hard limit.

Figure 3:
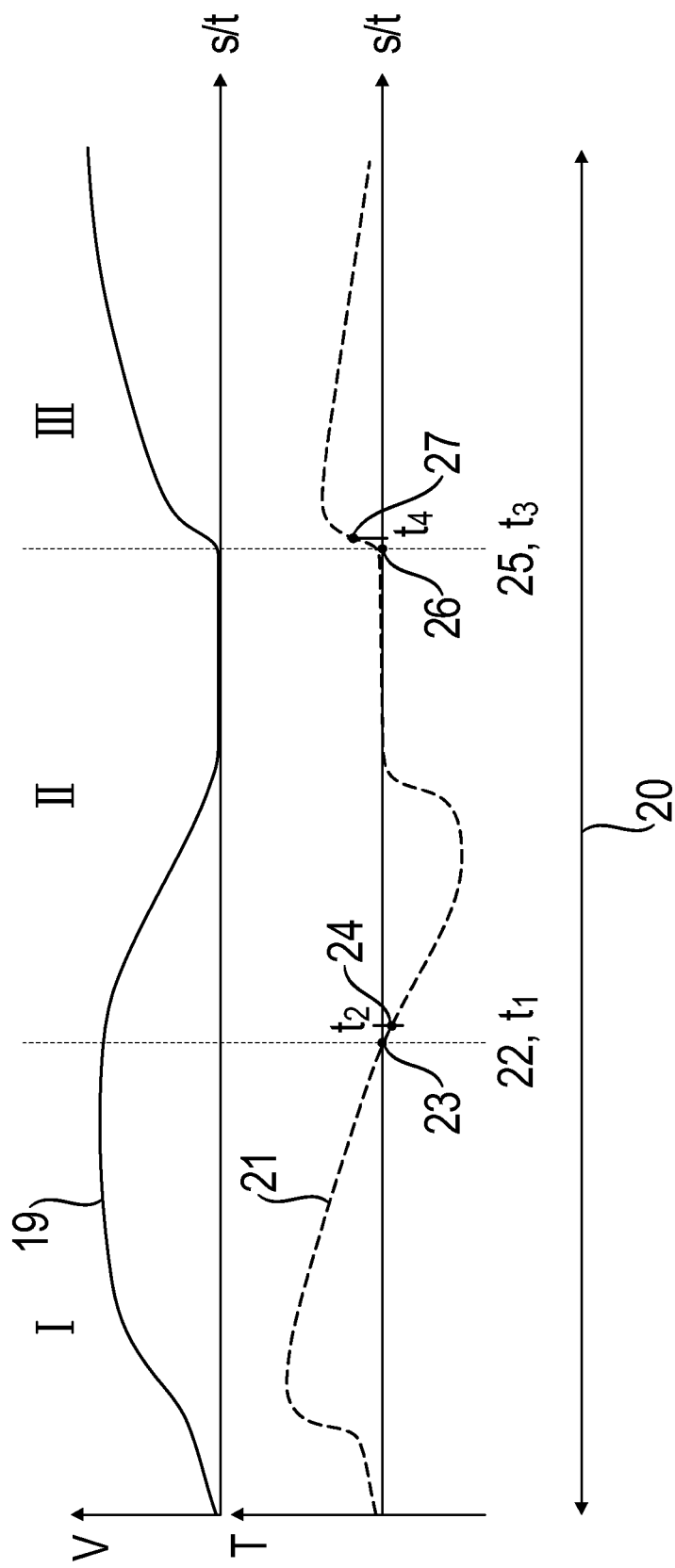
FIG. 3 shows diagrams including target torque values and target speed values with respect to time and with respect to waypoints within a prediction horizon.

FIG. 3 shows two diagrams arranged one above the other. The first diagram represented at the top in FIG. 3 shows a profile of target speed values 19 within a prediction horizon 20. The second diagram represented in FIG. 3 below the first diagram shows a profile of target torque values 21, which are associated with the target speed values 19 above these. Although the profiles of the target speed values 19 and of the target torque values 21 are represented continuously as a graph in FIG. 3, the target speed values 19 and the target torque values 21 can be discrete values, which are associated with discrete points in time and/or waypoints. The horizontal axes of the two diagrams can represent the time profile t and/or waypoints s within the prediction horizon 20.

The processor unit 3 can carry out an autonomous driving function of the motor vehicle 1 in a torque specification operating mode or in a speed specification operating mode as a function of the level of the target torque values 21. In a first range I (represented on the left in FIG. 3) of the prediction horizon 20, the target torque values 21 are positive, and so the processor unit 3 will carry out the autonomous driving function in the torque specification operating mode in which the electric machine 8 is controlled by an open-loop system based on the target torque values 21. Optionally, a speed control can be superimposed on the torque specification operating mode.

In a second range II (represented in the center in FIG. 3) of the prediction horizon 20, the target torque values 21 are negative, for example, because the motor vehicle 1 is to be brought to a standstill in order, for example, to stop at a red traffic light. Therefore, the target speed values 19 in the second range II drop to the value zero ("motor vehicle 1 stopped"). Once this target speed value has been reached, the target torque value has also risen back to the value zero (out of the negative range). The processor unit 3 will carry out the autonomous driving function within the second range II in the speed specification operating mode in which the speed governor 18 is controlled by an open-loop system exclusively based on the target speed values 19 and not on the target torque values 21.

In particular, a change-over from the torque specification operating mode (first range I) into the speed specification operating mode (second range II) takes place at a "negative" zero crossing 22 of the target torque value 21. The negative zero crossing can be detected or defined, in particular, in that a first target torque value 23 assumes the value zero at a first point in time $t_1$ and an immediately subsequent second target torque value 24 is negative at a second point in time $t_2$. In other words, the target torque values 21 fall or drop into the negative range at the first target torque value 23.

In a third range III (represented on the right in FIG. 3) of the prediction horizon, the target torque values 21 are positive again, and so the processor unit 3 will carry out the autonomous driving function in the torque specification operating mode again, wherein the electric machine 8 is controlled by an open-loop system based on the target torque values 21. Optionally, a speed control can be superimposed on the torque specification operating mode in this case as well.

A change-over from the speed specification operating mode (second range II) into the torque specification operating mode (third range III) can take place at a "positive" zero crossing 25 of the target torque value 21. This positive zero crossing can be detected or defined, in particular, due to the fact that a third target torque value 26 assumes the value zero at a third point in time $t_3$ and an immediately subsequent fourth target torque value 27 is positive at a fourth point in time $t_4$. In other words, the target torque values 21 rise into the positive range at the third target torque value 26.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

I first range of the prediction horizon
II second range of the prediction horizon
III third range of the prediction horizon
$t_1$ first point in time
$t_2$ second point in time
$t_3$ third point in time
$t_4$ fourth point in time
1 vehicle
2 system
3 processor unit
4 memory unit
5 communication interface
6 detection unit
7 drive train
8 electric machine
9 battery
10 transmission
11 computer program product
12 GPS sensor
13 MPC algorithm
14 longitudinal dynamics model
15 cost function
16 driver assistance system
17 internal combustion engine
18 speed governor
19 target speed values
20 prediction horizon
21 target torque values
22 "negative" zero crossing 23 first target torque value (zero)
24 second target torque value (negative)
25 "positive" zero crossing
26 third target torque value (zero)
27 fourth target torque value (positive)

The invention claimed is:

1. A processor unit (3) for executing an autonomous driving function of a motor vehicle (1) by model predictive control, wherein the processor unit (3), by executing an MPC algorithm (13), which includes a longitudinal dynamics model (14) of a drive train (7) of the motor vehicle (1), is configured for:
   determining target torque values (21) lying within a prediction horizon (20);
   determining target speed values (19) lying within the prediction horizon (20);
   as a function of a level of the target torque values (21), selecting a torque specification operating mode for autonomous driving of the motor vehicle (1) when the target torque value (21) assumes a positive value and a speed specification operating mode for autonomous driving of the motor vehicle (1) when the target torque value (21) assumes a negative value; and
   carrying out an autonomous driving function of the motor vehicle (1) in the torque specification operating mode or in the speed specification operating mode,
   wherein, in the torque specification operating mode, a prime mover (8) of the drive train (7) is controlled by an open-loop system based on the target torque values (21),
   wherein, in the speed specification operating mode, a speed governor (18) of the drive train (7) is controlled by an open-loop system based on the target speed values (19), and
   wherein the prime mover (8) comprises an electric machine (8).

2. The processor unit (3) of claim 1, wherein the processor unit (3) is configured for carrying out the autonomous driving function exclusively in the speed specification operating mode when a target torque value (21) assumes a negative value by executing the MPC algorithm (13).

3. The processor unit (3) of claim 1, wherein:
   the processor unit (3) is configured for changing over from the torque specification operating mode into the speed specification operating mode at a first point in time (t1) by executing the MPC algorithm (13);
   a first target torque value (23) assumes the value zero at the first point in time (t1); and
   a second target torque value (24) assumes a negative value at a second point in time (12) immediately following the first point in time (11).

4. The processor unit (3) of claim 1, wherein:
   the processor unit (3) is configured for changing over from the speed specification operating mode into the torque specification operating mode at a third point in time (t3) by executing the MPC algorithm (13);
   a third target torque value (26) assumes the value zero at the third point in time (t3); and
   a fourth target torque value (27) assumes a positive value at a fourth point in time (t4) immediately following the third point in time (t3).

5. A motor vehicle (3) comprising:
   the processor unit (3) of claim 1;
   the prime mover (8);
   the speed governor (18); and
   a driver assistance system (16) configured for accessing target torque values (21) and target speed values (19) by a communication interface (8), wherein the target torque values (21) and the target speed values (19) have been determined by the processor unit (3),
   in the torque specification operating mode, controlling the prime mover (8) by the open-loop system based on the target torque values (21),
   in the speed specification operating mode, controlling the speed governor (18) by the open-loop system based on the target speed values (19), and
   carrying out an autonomous driving function of the motor vehicle (1) as a function of the level of the target torque values (21) in the torque specification operating mode or in the speed specification operating mode.

6. The processor unit (3) of claim 1, wherein the autonomous driving function is configured to operate the vehicle (1) for autonomous travel without a vehicle occupant controlling the vehicle (1) or to assist the occupant with one or more of steering, turn-signaling, acceleration, and braking of the vehicle (1).

7. A processor unit (3) for executing an autonomous driving function of a motor vehicle (1) by model predictive control, wherein the processor unit (3), by executing an MPC algorithm (13), which includes a longitudinal dynamics model (14) of a drive train (7) of the motor vehicle (1), is configured for:
   determining target torque values (21) lying within a prediction horizon (20);
   determining target speed values (19) lying within the prediction horizon (20); and
   as a function of a level of the target torque values (21), carrying out an autonomous driving function of the motor vehicle (1) in a torque specification operating mode or in a speed specification operating mode,
   wherein, in the torque specification operating mode, a prime mover (8) of the drive train (7) is controlled by an open-loop system based on the target torque values (21),
   wherein, in the speed specification operating mode, a speed governor (18) of the drive train (7) is controlled by an open-loop system based on the target speed values (19),
   wherein the prime mover (8) comprises an electric machine (8),
   wherein the MPC algorithm (13) comprises a cost function (15) to be minimized,
   wherein the cost function (15) comprises, as a first term, an electrical energy weighted with a first weighting factor and predicted according to the longitudinal dynamics model (14), which is provided within the prediction horizon by a battery (9) of the drive train (7) for driving the electric machine (8),
   wherein the cost function (15) comprises, as a second term, a driving time weighted with a second weighting factor and predicted according to the longitudinal dynamics model (14), which the motor vehicle (1) requires in order to cover an entire distance predicted within the prediction horizon, and
   wherein the processor unit (3) is configured for determining an input variable for the electric machine (8) by executing the MPC algorithm (13) as a function of the first term and as a function of the second term such that the cost function is minimized.

8. A method for carrying out an autonomous driving function of a motor vehicle (1) by model predictive control, the method comprising:
- determining target torque values (21) lying within a prediction horizon by executing an MPC algorithm (13) that includes a longitudinal dynamics model (14) of a drive train (7) of the motor vehicle (1);
- determining target speed values (19) lying within the prediction horizon (20) by executing the MPC algorithm (13);
- as a function of a level of the target torque values (21), selecting a torque specification operating mode for autonomous driving of the motor vehicle (1) when the target torque value (21) assumes a positive value and a speed specification operating mode for autonomous driving of the motor vehicle (1) when the target torque value (21) assumes a negative value; and
- implementing an autonomous driving function of the motor vehicle (1) in the torque specification operating mode or in the speed specification operating mode,
- wherein, in the torque specification operating mode, a prime mover (8) of the drive train (7) is controlled by an open-loop system based on the target torque values (21),
- wherein, in the speed specification operating mode, a speed governor (18) of the drive train (7) is controlled by an open-loop system based on the target speed values (19), and
- wherein the prime mover (8) comprises an electric machine (8).

9. A non-transitory computer program product (11) for executing an autonomous driving function of a motor vehicle (1) by model predictive control, the computer program product (11), when run on a processor unit (3), instructs the processor unit (3) by executing an MPC algorithm (13), which includes a longitudinal dynamics model (14) of a drive train (7) of the motor vehicle (1), to:
- determine target torque values (21) lying within a prediction horizon (20);
- determine target speed values (19) lying within the prediction horizon (20);
- as a function of a level of the target torque values (21), selecting a torque specification operating mode for autonomous driving of the motor vehicle (1) when the target torque value (21) assumes a positive value and a speed specification operating mode for autonomous driving of the motor vehicle (1) when the target torque value (21) assumes a negative value; and
- implement an autonomous driving function of the motor vehicle (1) in the torque specification operating mode or in the speed specification operating mode,
- wherein, in the torque specification operating mode, a prime mover (8) of the drive train (7) is controlled by an open-loop system based on the target torque values (21),
- wherein, in the speed specification operating mode, a speed governor (18) of the drive train (7) is controlled by an open-loop system based on the target speed values (19), and
- wherein the prime mover (8) comprises an electric machine (8).

* * * * *